June 27, 1933.  P. C. PEREZ  1,915,616
CONTAINER FOR ICES, CREAMS, OR SIMILAR SUBSTANCES
Filed Aug. 16, 1930
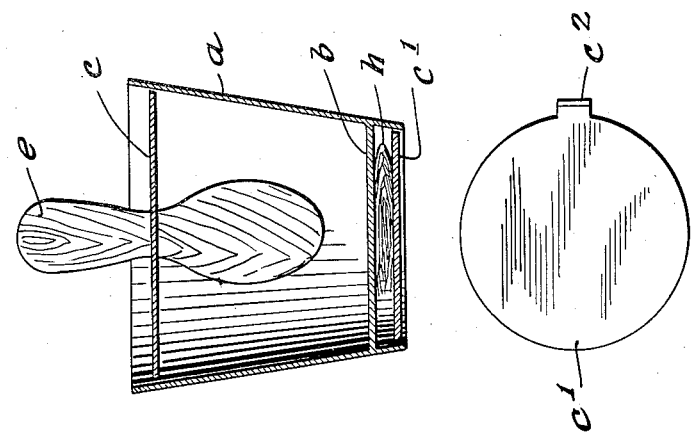
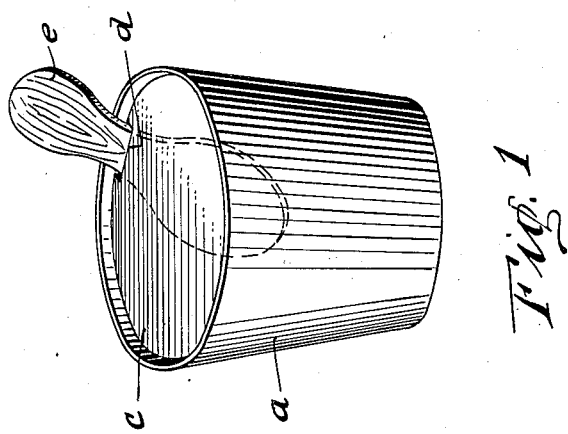
Inventor
Pedro Clerigo Perez
By his Attorney Patented June 27, 1933

1,915,616

UNITED STATES PATENT OFFICE

PEDRO CLÉRIGO PEREZ, OF BUENOS AIRES, ARGENTINA

CONTAINER FOR ICES, CREAMS, OR SIMILAR SUBSTANCES

Application filed August 16, 1930. Serial No. 475,810.

The present invention refers to improvements in containers for ices, creams or similar substances which are complementary to the container as it implies the delivery to the consumer of the ordinary container together with a spoon and napkin and not separated thereof.

These improvements have been designed in order to obtain a container which is in itself complete, i. e., a container which will carry in its interior a small spoon and napkin.

Reference is made to the accompanying drawing, wherein:

Fig. 1 is a perspective view of the container for ices, creams or similar substances;

Fig. 2 is a transverse cross section view of the container and plan view of bottom cover.

Construction

The construction comprises a cone ($a$) of paper or any other similar material, the bottom of which ($b$) (Fig. 2 forms a solidary body with the walls of the cone ($a$) and is located at a certain distance from the edge of the walls ($a$). A cover ($c$) is provided with a slit or opening ($d$) wide enough to coincide with the width of the narrow portion of the spoon ($e$) to thus afford a fixture. This cover ($c$) is removable as also the bottom or bottom cover ($c^1$) which may be of circular form or provided with an ear or projection, as indicated by ($c^2$). The napkin ($h$) after being properly folded it is placed within the space formed between the bottom ($b$) and bottom cover ($c^1$).

Use

The container is to be used in the following manner: After having placed the napkin ($h$) in the space existing between the bottom ($b$) and the bottom cover ($c^1$), the cone ($a$) is filled with ices, cream or other similar substances. The spoon ($e$) is fixed in position and the cover ($c$) is secured. The napkin may be removed by simply detaching the bottom cover ($c^1$).

With these improvements it is possible to obtain a container capable of carrying a spoon and napkin which joints constitute an hygienic and characteristic novelty as the spoon and napkin on being placed in position in the cone before leaving the factory, are not liable to the inconveniences due to rehandling during subsequent sales until finally reaching the hands of the consumer.

The material to be utilized in the construction of these improvements may be of any variety capable of serving the ends described above.

Having thus described my invention, what I claim as new and desire to secure by Letters Patent is:

A confection container comprising a substantially frusto-conically shaped body, a removable cover having an opening the walls of which closely fit the contour of a spoon to be held in the confection, a bottom for said container, a removable cover for said bottom forming a chamber therein, a tab on said bottom cover facilitating its removal from the container, and a napkin held in said chamber.

In testimony whereof, I affix my signature.

P. CLÉRIGO PEREZ.